(12) United States Patent
Huybrechts et al.

(10) Patent No.: US 7,124,645 B2
(45) Date of Patent: Oct. 24, 2006

(54) MAGNETIC-INDUCTIVE MEASURING DEVICE FOR FLOWING SUBSTANCES AND METHOD FOR ITS PRODUCTION

(75) Inventors: Dirk Huybrechts, Heidelberg (DE); Paul Szasz, Plankstadt (DE); Dominik Eifel, Schwetzingen (DE); Eniet Asaah, Mannheim (DE); Hans-Werner Schwiderski, Norten-Hardenberg (DE); Andreas Thone, Northeim (DE); Ralf Huck, Hanau (DE); Wolfgang Scholz, Minden (DE); Fabrizio Lorito, Mailand (IT); Albrecht Vogel, Stutensee (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/958,232

(22) Filed: Oct. 6, 2004

(65) Prior Publication Data

US 2005/0193833 A1    Sep. 8, 2005

(30) Foreign Application Priority Data

Oct. 10, 2003   (DE)   ................................ 103 47 878

(51) Int. Cl.
G01F 1/58     (2006.01)
(52) U.S. Cl. .................................... 73/861.12
(58) Field of Classification Search ............. 73/861.12, 73/861.52, 861.08, 861.04, 861.194
See application file for complete search history.

(56) References Cited

U.S. PATENT DOCUMENTS

| | | | |
|---|---|---|---|
| 3,724,268 A * | 4/1973 | Kuwabara | .................... 376/246 |
| 4,420,982 A * | 12/1983 | Schmoock | ................ 73/861.12 |
| 4,631,969 A | 12/1986 | Schmoock | |
| 4,774,844 A | 10/1988 | Davis | |
| 5,388,455 A | 2/1995 | Hamby et al. | |
| 6,461,314 B1 * | 10/2002 | Pant et al. | ...................... 601/2 |
| 6,920,799 B1 * | 7/2005 | Schulz | .................... 73/861.52 |
| 2003/0061886 A1 | 4/2003 | Guazzoni et al. | |

FOREIGN PATENT DOCUMENTS

| | | |
|---|---|---|
| DE | 20 00 762 | 7/1971 |
| DE | 2 040 682 | 2/1972 |
| DE | 2 104 394 | 8/1972 |
| DE | 3423921 C1 | 1/1986 |
| DE | 197 08 857 A1 | 7/1998 |
| DE | 198 31 894 C2 | 1/2000 |

* cited by examiner

*Primary Examiner*—Jewel Thompson
(74) *Attorney, Agent, or Firm*—Buchanan Ingersoll & Rooney PC

(57)   ABSTRACT

The invention relates to a magnetic-inductive measuring device (1) for flowing substances (substance being measured), with a measuring tube (2) and a further subsystem respectively for recording measuring signals, comprising a signal pickup (electrode arrangement (20, 22) for signal tapping), for generating a magnetic field, comprising at least two exciting coils (30) and a ferromagnetic core (32) (magnetic system), and for bounding the device on the ambient side (housing), and is characterized in that at least one of the further subsystems is entirely or partly formed by a casting compound and/or embedded in a casting compound.

20 Claims, 6 Drawing Sheets

1e

Figure 1:
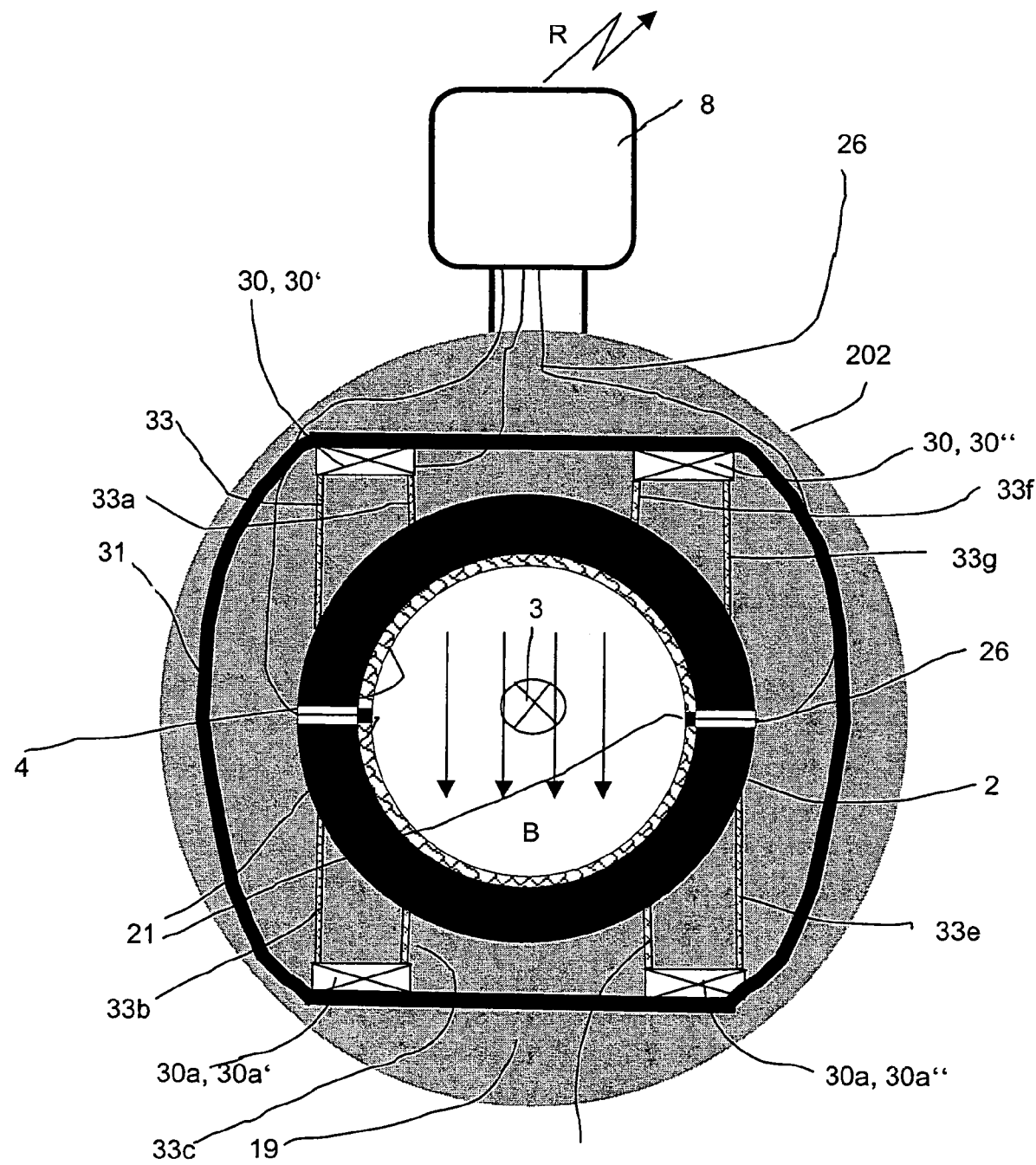

MAGNETIC-INDUCTIVE MEASURING DEVICE FOR FLOWING SUBSTANCES AND METHOD FOR ITS PRODUCTION

The invention relates to a magnetic-inductive measuring device for flowing substances—also referred to hereafter as MID for short, and to a method for producing a magnetic-inductive measuring device for flowing substances.

Magnetic-inductive measuring devices for flowing substances have long been known in the prior art. The basic construction and the operating principle are described for example in the Lexikon der Mess- und Automatisierungstechnik [Lexicon of measuring and automation technology], by Elmar Schrufer, VDI-Verlag Dusseldorf 1992, pages 262–263. On account of the operating principle, magnetic-inductive measuring devices can be used only for measuring the through-flow of electrically conductive fluid substances.

The simple and robust mechanical construction, in particular the straight measuring tube without built-in obstacles or moving parts, makes them preferred measuring devices for use in a series of industrial process installations, for example in the area of water management (flow measurement in drinking water preparation and sewage treatment), in the area of the chemical and petrochemical industry (flow measurement of water, acids, alkaline solutions, etc), in the area of the pharmaceutical industry and in the area of the food industry (flow measurement of water, juices, beer, milk products, etc).

Magnetic-inductive measuring devices of the generic type comprise a measuring tube, which is flowed through by the substance being measured, and further subsystems attached to the measuring tube, in particular a subsystem for signal pickup, a subsystem for generating a magnetic field, known as a magnetic system for short, a housing for protection from environmental influences and a connection device for receiving the electrical interface of the measuring device.

Today, the measuring tube is generally a steel tube, with or without end flanges, with connecting elements welded onto the outer circumference of the measuring tube for the mounting of other device components and subsystems on the measuring tube. Installation in the process pipeline system may take place either by flange mounting, or else by intermediate-flange mounting, known as wafer mounting.

Magnetic-inductive measuring devices are today used in applications with a process pressure of up to 40 bar, which imposes very high requirements on the compressive strength and resistance to deformation of the hydraulic system. Pressure-induced deformations and vibrations in the hydraulic system can lead to distortions and geometrical displacements in it signal pickup and magnetic systems that are attached to the measuring tube and impair the measuring accuracy and reproducibility of the measurement.

Today there are also known measuring tubes made of ceramic for niche applications, some with measuring and shielding electrodes embedded in them, and measuring tubes made of thermoplastic.

It has also been proposed to construct the measuring tube from fibre composite material, for example from glassfibre reinforced plastic (GRP). Such a measuring tube combines mechanical stability and compressive load-bearing capacity with chemical resistance and electrical insulating properties. It has been found that, if it is of a suitable diameter, a measuring tube produced by the fibre winding technique from GRP material already withstands an internal tube pressure of 40 bar for a long period without inadmissible mechanical deformation of the tube when it has a wall thickness of a few millimeters.

Since a measuring tube formed from GRP is an electrical insulator, no additional insulating lining (liner) is required, which makes production of the measuring device much easier and much less expensive.

As the subsystem for signal pickup, today there are known conductive and capacitor signal pickups. In the case of the conductive signal pickup, the electrodes are galvanically in connection with the substance being measured. Conductive signal pickups are usually two electrodes which are introduced into the measuring tube through bores. In the case of a measuring tube made of steel, these bores and the electrodes must be electrically insulated from one another; it is therefore then necessary to line the steel tube on the inside with an electrically nonconducting layer, known as the liner. This makes mounting of the measuring device very complex.

In the case of the capacitive signal pickup, the electrodes are galvanically separated from the substance being measured. Extensive electrodes which are located in or behind the electrically nonconductive tube lining are used. Shielding electrodes are also provided between the measuring electrode and the measuring tube to prevent capactitive feedthrough to the outside.

The subsystem for generating a magnetic field is today generally realized by two coils with poles and a magnetic return, which are mounted around the measuring tube. The geometrical tolerances to be maintained during mounting are very small, which makes mounting complex and expensive.

The magnetic return is in this case usually realized by a number of sheet metal strips stacked one on top of the other and riveted together. Several production steps are necessary to produce them in this form.

The housing represents a considerable cost factor in today's customary magnetic-inductive flow measuring devices (MID), because it is realized either from separate half-shells, produced for example by the diecasting method, or else as a welded sheet-metal construction.

One technical disadvantage is that connecting elements within the housing, for example cables, cannot be positionally fixed by the attachment of the housing alone. Vibrations of the connection lines can lead to considerable signal disturbances and consequently measuring inaccuracies, in particular in the case of capacitive signal pickups.

The connection device makes it possible for the measuring device to be connected to the evaluation electronics, which are accommodated in a subassembly that is often also referred to as a transmitter or measuring transducer. The transmitter may be spatially separate from the measuring device, or else integrated in the terminal box.

Today's customary production method is characterized by relatively small sizes of the batches of each variant of the device on the one hand, and a high number of variants of the device on the other hand. Since the subsystem for the magnetic field generation is mechanically built onto the hydraulic system, each variant in the hydraulic system also requires different mounting kits for the built-on subsystems.

It is therefore the object of the present invention to provide a magnetically inductive measuring device which can be produced at low cost and covers the entire range of applications with only a very small variety of variants.

Therefore, according to the invention at least one of the further subsystems is entirely or partly formed by a casting compound and/or embedded in a casting compound.

In a particularly advantageous embodiment of the invention, the complete magnetic system or parts of it may be embedded in an electrically nonconductive casting compound.

In this case, the ferromagnetic core alone or the exciting coils together with the ferromagnetic core may be embedded in an electrically nonconductive casting compound.

According to a further preferred embodiment of the invention, the magnetic system is embedded in the housing formed from an electrically nonconductive casting compound.

The technical advantage of this embodiment according to the invention is that the magnetic system is fixed very well and permanently in place and at the same time is protected from external effects, such as for example moisture, dirt, vibrations etc, all possible cavities between the measuring tube and the device bounding surface on the ambient side being automatically filled. Production can in this case be carried out at very low cost.

A measuring device according to the invention has a known measuring tube, for example made of metal with an insulating lining layer and conductive electrodes, or a measuring tube formed by the fibre winding technique with embedded capacitive signal tapping electrodes, or from ceramic with conductive or capacitive electrodes, or from thermoplastic with conductive or capacitive electrodes, or from ceramic or thermoplastic without embedded electrodes.

The compressive strength and chemical resistance with respect to the substance being measured is provided by the measuring tube. A measuring tube made of fibre composite material for example combines mechanical stability and compressive load-bearing capacity with chemical resistance and electrical insulating properties.

An electrically nonconductive, filled epoxy resin or an electrically nonconductive, filled polyurethane comes into consideration for example as the casting compound. The casting mould may be made either of sheet metal or plastic, and such that it is reusable or in the form of a "non-permanent mould".

Apart from embedding the magnetic system, it is also possible to embed the electrical leads in the electrically nonconductive casting compound. The leads are then kept free from vibration without any great effort, which results in increased measuring accuracy and immunity from interference.

Furthermore, an electronic signal converter subassembly, for example an impedance converter in the case of capacitive signal tapping, and/or an electronic signal preamplifier may be arranged near the measuring electrodes and be embedded along with them in the electrically nonconductive casting compound.

A further advantage is the very good positional fixing of the ferromagnetic core if it is embedded in layers of fibre composite material. While in the case of conventional systems a great effort has to be expended in respect of constructing a system that is insensitive to vibration and resistant to shock (by mechanical means or additional adhesive bonds), this is obtained automatically and without additional effort in the case of the magnetic system embedded in casting compound.

What is more, no additional corrosion protection has to be provided on the magnetic system, since the magnetic system is completely protected by being embedded in the casting compound.

After preassembly of the electrical and magnetic components of the signal-pickup subsystem and of the magnetic system, these components are surrounded by the layer realizing the housing function by casting with a casting compound. The cost advantage is obtained by only little material and production time being required for this production step.

The technical advantage is obtained by all the components being permanently fixed in place in this way in an outstanding manner.

A shielding layer against electromagnetic interference fields (EMF shielding) may be inserted in the housing cast in this way and be cast along with it. This layer may consist for example of a metallic gauze or mesh, for example made of copper or the like or of conductive plastics.

Further advantageous refinements and improvements of the invention and further advantages can be taken from the further subclaims.

Figure 2:
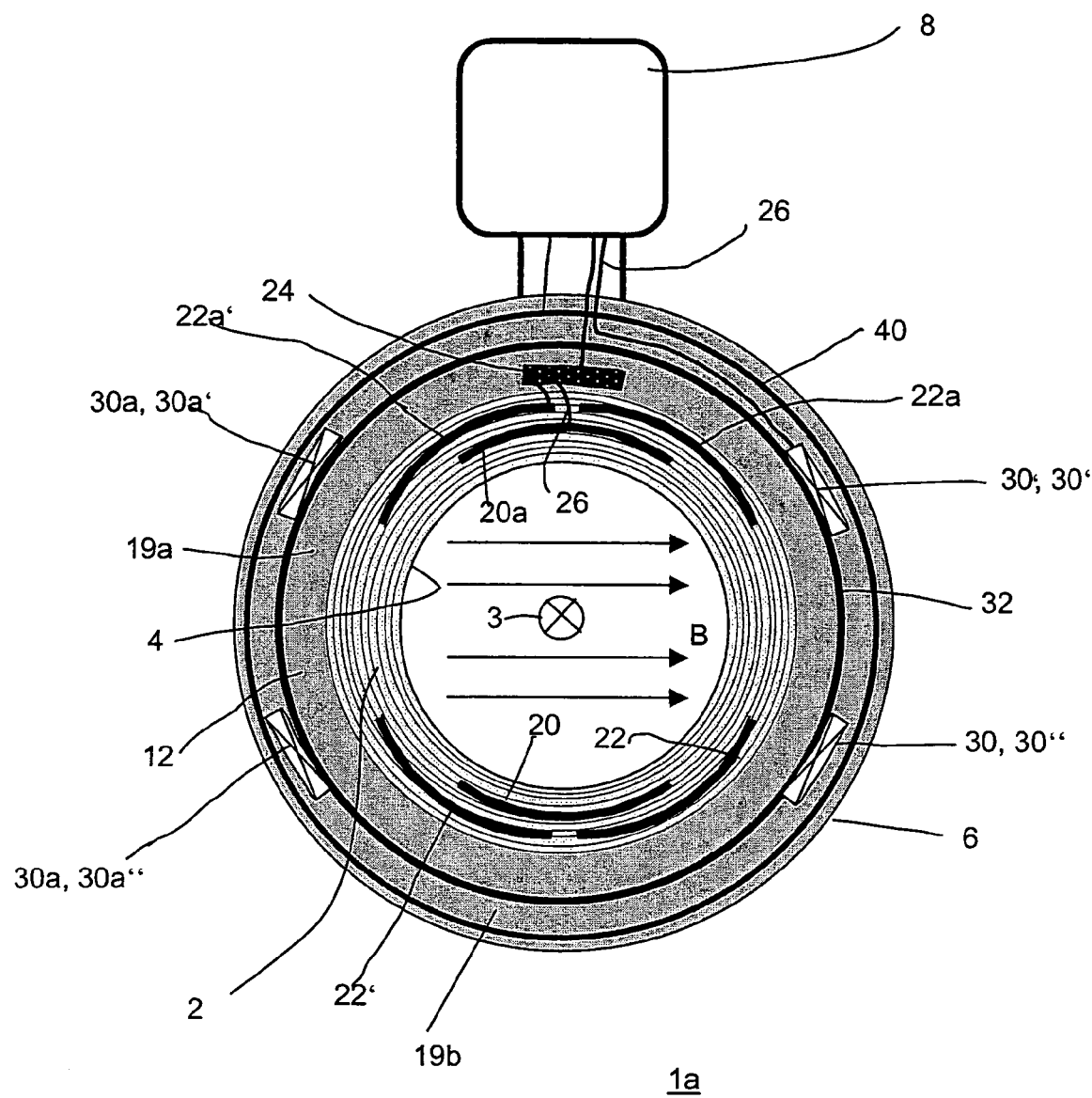
Figure 3:
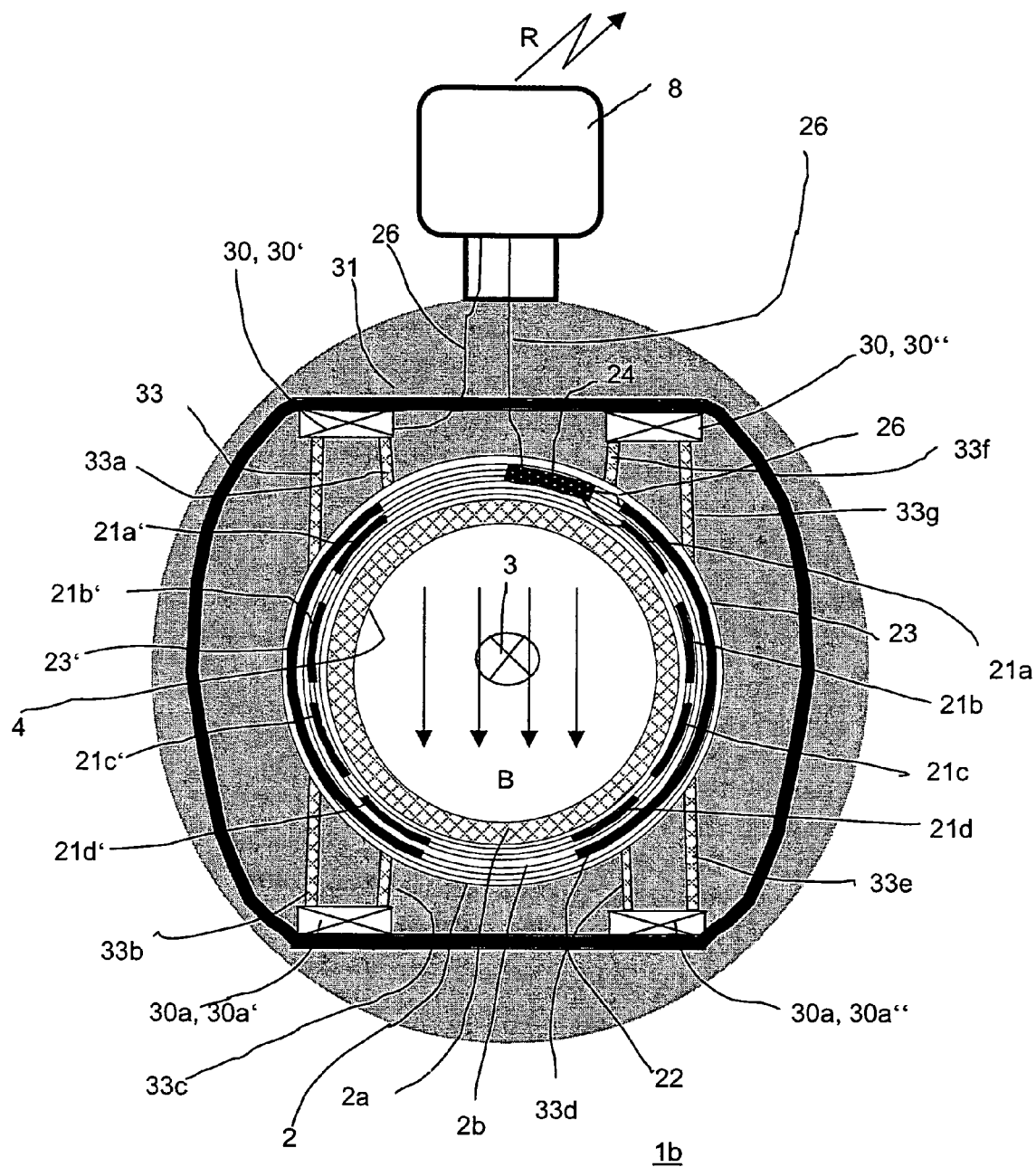
Figure 4:
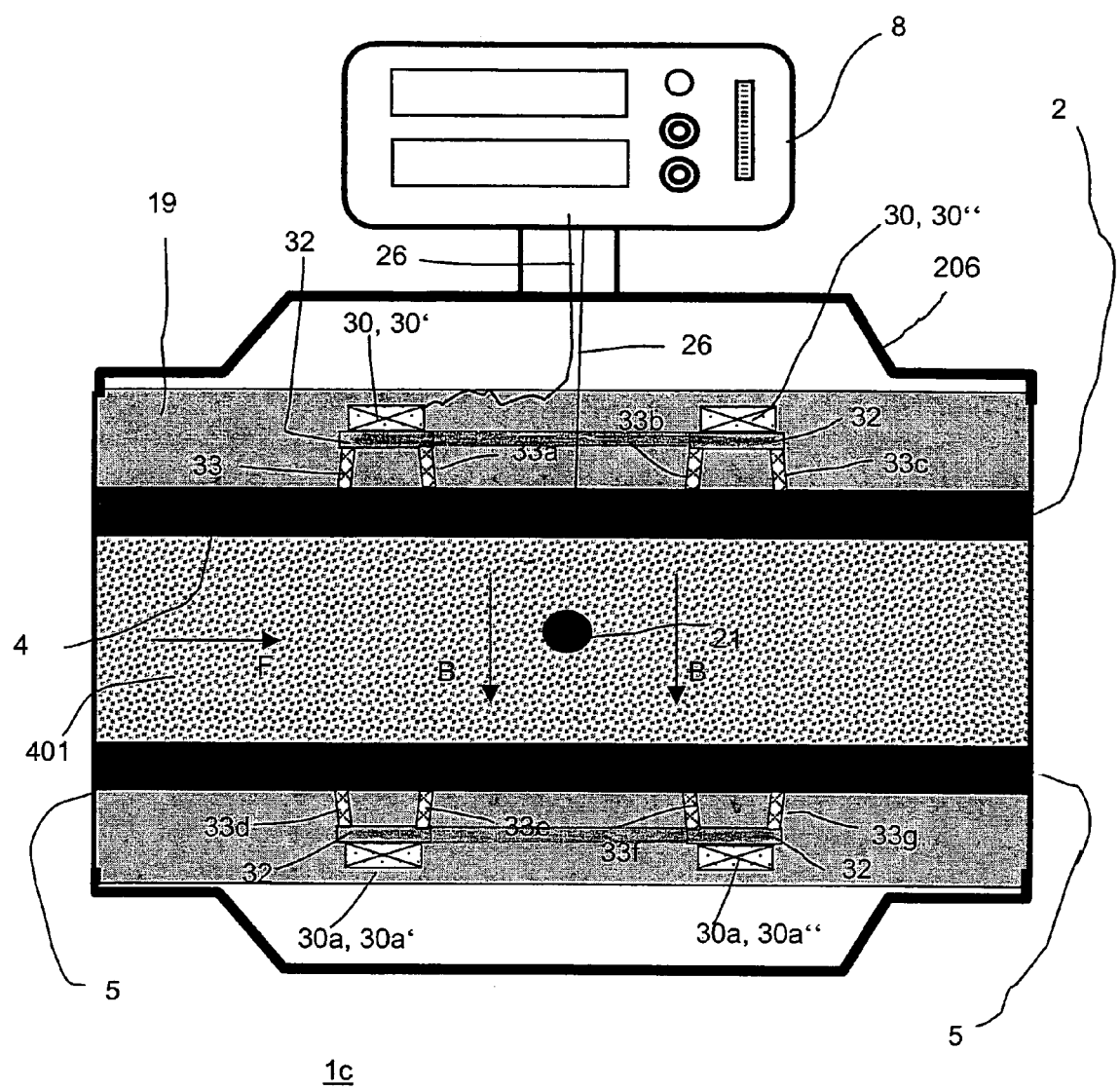
Figure 5:
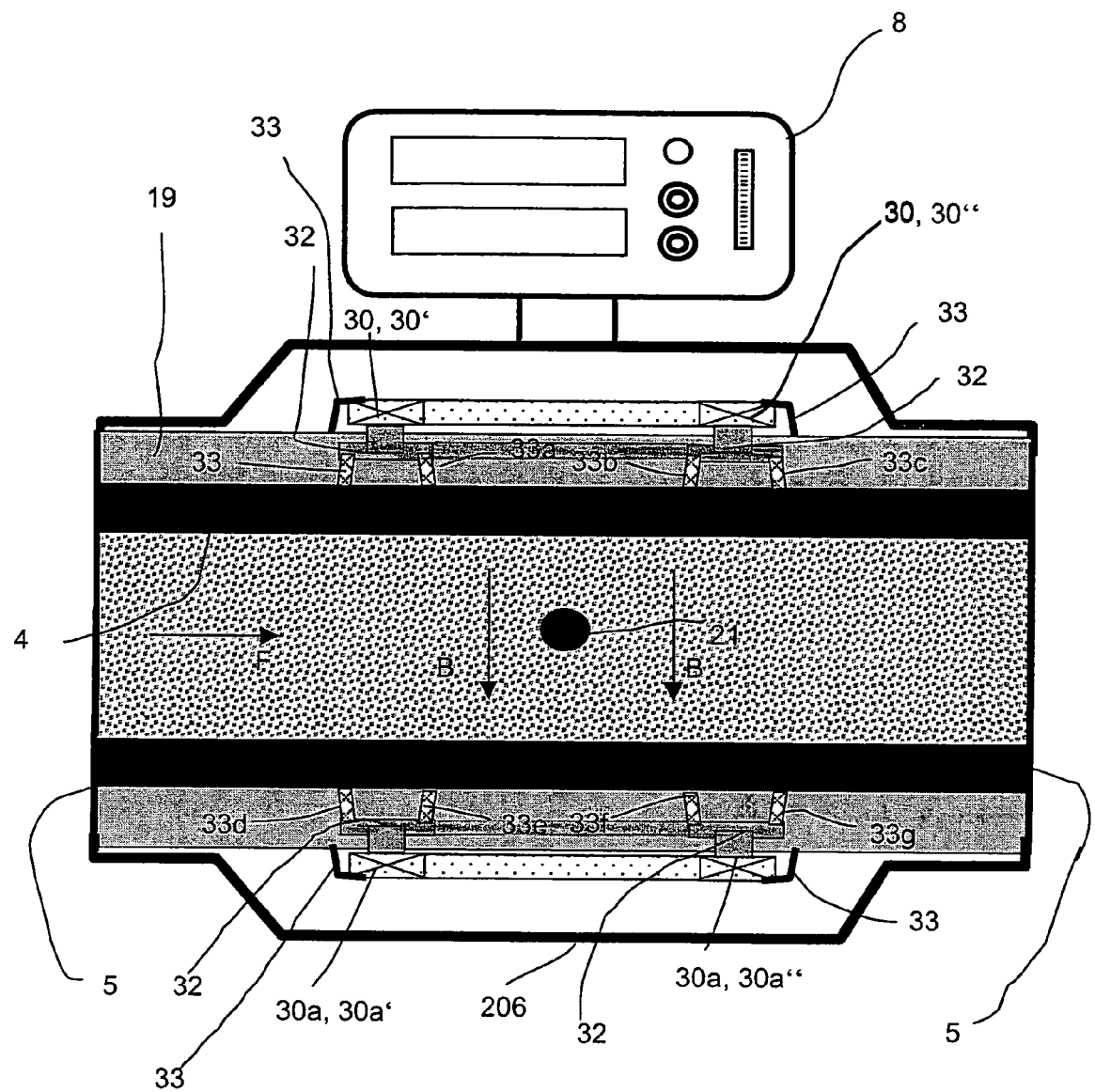
Figure 6:
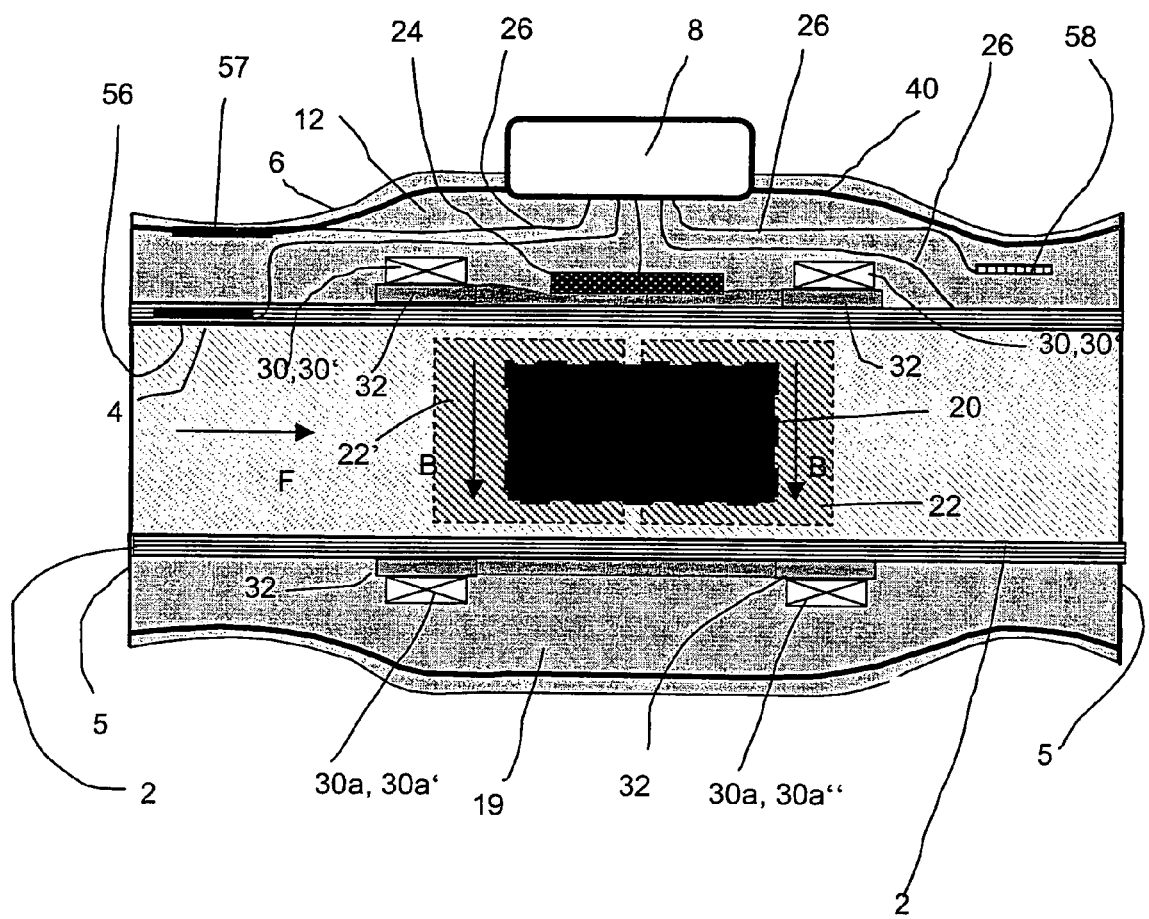

The invention and further advantageous refinements and improvements of the invention are to be explained and described in more detail on the basis of the drawings, in which 6 exemplary embodiments of the invention are represented and in which:

FIG. 1 shows a cross-sectional view of an embodiment of an MID according to the invention, in which the magnetic system and the signal converter are embedded in the housing formed from a casting compound, FIG. 2 shows a cross-sectional view of a second embodiment of an MID according to the invention, FIG. 3 shows a cross-sectional view of a third embodiment of an MID according to the invention, FIG. 4 shows a longitudinal section through an MID according to the invention in which only the magnetic system is embedded in a casting compound, FIG. 5 shows a longitudinal section through an MID according to the invention in which the magnetic system is partly embedded in a casting compound, and FIG. 6 shows a longitudinal section through an MID in which additional sensors for temperature and strain measurement are embedded.

FIG. 1 shows a cross section through a magnetically inductive measuring device 1, which comprises a measuring tube 2 made of steel with two conductive measuring electrodes 21, lying opposite each other perpendicularly in relation to the measuring tube centre axis 3, and an insulating lining layer 4, attached to the tube inner wall 4.

A magnetic system with two annular exciting coils 30, 30*a* and a ferromagnetic core 31 is attached by means of known mounting means 33, 33*a*, 33*b*, 33*c*, 33*d*, 33*e*, 33*f*, 33*g*—that is supports, bolts, screws, clamps and similar parts, which are only schematically indicated in FIG. 1 and need not be described in any more detail here since they are sufficiently known to a person skilled in the art of constructing MIDs—to the outer side of the measuring tube 2. The winding planes of the annular coils 30, 30*a* run parallel to each other and to the tube centre axis 3. Because of the representation in cross section, only the sectional area 30', 30", 30*a*', 30*a*" of the annular coils 30, 30*a* can be seen. The ferromagnetic core 31 is realized in a conventional way by a number of sheet metal strips stacked one on top of the other and riveted together. The magnetic system has the effect of generating in the interior of the measuring tube 2 a magnetic field which runs perpendicularly in relation to the tube centre axis 3 and to the measuring electrodes 21 and the pattern of which is indicated by the arrows B.

The magnetic system is embedded in a layer 19 of casting compound enclosing the measuring tube. Together with the magnetic system, the electrical leads to the coils and to the measuring electrodes are also embedded in the casting compound. In the present embodiment, this casting compound is an electrically nonconductive, filled epoxy resin. The casting compound adheres to the outer surface of the measuring tube 2, so that no intermediate space or gap into which dirt or moisture could possibly penetrate is produced between the measuring tube and the casting compound. The enclosing layer 19 completely surrounds the magnetic system. Its outer peripheral contour is cylindrical. Outwardly, it forms the housing of the measuring device 1 and protects all the subsystems cast in it from penetration of dust and water. Given appropriately careful process control of the casting operation—the surface quality of the enclosing layer may be very good, smooth and free from defects.

All the cast in components and subsystems are consequently fixed in place permanently and in an outstanding way. The magnetic coils and the ferromagnetic core can no longer twist with respect to each other, if for example vibrations or shocks happen to occur during operation of the measuring device. Therefore, the requirements for the mechanical fixing of the magnetic system on the measuring tube 2 can be reduced, whereby the production of the measuring device becomes easier and less expensive. The mechanical fixing of the magnetic system must then only be designed to be robust enough for the coil and the magnetic return to stay immovably in position during the casting and curing, which is a less demanding requirement than that which is currently imposed on the mechanical fixing.

Fastened on the housing formed by the casting compound is a transmitter 8, which comprises electronic circuits for magnetic field control, measuring signal pickup, measuring signal processing and communication. Here, the transmitter 8 comprises a wireless signal transmission unit, for wireless signal transmission—indicated by the arrow R—and consequently wireless incorporation of the MID in a higher-level process control system.

For applying the casting compound 19, the measuring tube 2 is enclosed with a casting mould after the mounting of the magnetic system. The mould is sealed with respect to the measuring tube and in itself, and is provided with an inlet and an outlet. The casting compound, for example filled epoxy resin, is introduced into this mould and cured. Subsequently, the mould is removed. The casting mould may be made either of sheet metal or plastic, and such that it is reusable or in the form of a "non-permanent mould".

In comparison with the conventional technique for constructing an MID, casting the magnetic system is accompanied not only by technical advantages but also considerable commercial advantages, since casting is much less labour-intensive, can for the most part be carried out in an automated manner and therefore costs less than conventional mounting.

FIGS. 2 to 6 show a number of variants, not to be considered exhaustive, of the embodiment that is shown in FIG. 1 and presented in detail above. It is therefore intended essentially to discuss below the parts that are different from the embodiment that is shown in FIG. 1. Similar or equivalent parts or subassemblies are in this case respectively designated by the same reference numerals.

In FIG. 2, a further embodiment of an MID 1a according to the invention is represented. The measuring tube 2 is a measuring tube which is constructed from laminate fibre composite material with a capacitive signal tap, having two extensive measuring electrodes 20, 20a and two divided shielding electrodes 22, 22' and 22a, 22a', which shield the measuring electrodes against the feedthrough of external electrical fields, embedded in the layers of fibre composite material of the measuring tube 2.

Also embedded here in the casting compound 19 is an electronic signal converter subassembly 24, an impedance converter and measuring signal preamplifier, which in this way can be arranged near the measuring electrodes 20, 20a. Especially in the case of capacitive signal tapping, it is very important that the impedance converter is arranged as near as possible to the measuring electrodes and that the connecting lines are mounted such that they are free from vibration, in order that error-free signal pickup, even of the smallest measuring signals, and correspondingly great measuring accuracy and resolution can be achieved.

In the case of the embodiment that is shown in FIG. 2, the ferromagnetic core 32 is formed from ferromagnetic, bendable strip material. The casting compound is applied in two substeps. Firstly, the inner part 19a is cast. The ferromagnetic core is placed on this and fixed, for example by tacking or adhesive bonding, and similarly the annular exciting coils 30, 30a are placed onto the ferromagnetic core and fixed. Then, the outer part 19b is cast, it also being possible for the outer part to be cast from a different material than the inner part 19a. A shielding layer 40, for example comprising an electrically conductive metal foil, a metal mesh or a film of electrically conductive plastic, may also be included during casting into the outer part 19b.

Given a correspondingly suitable casting compound, however, it may be cast in one step. Then, first the coils and core together are fixed, and during the subsequent casting the casting compound flows into all the cavities and fills them completely.

In the case of the embodiment that is shown in FIG. 3, the measuring tube 2 is formed from two part-tubes 2a and 2b engaging concentrically one inside the other. The first, inner part-tube 2a consists of thermoplastic. It can be produced very inexpensively, but has a sufficient compressive strength. Formed around the inner part-tube 2a is a second, outer part-tube 2b, comprising layers of fibre composite material. The outer part-tube 2b lends the measuring tube 2 the necessary compressive strength, in order that it can be operated in the required pressure range of up to 40 bar.

Embedded in the layers of the outer part-tube 2a is a capacitive signal pickup system as a multielectrode arrangement with four pairs of measuring electrodes 21a, 21a'; 21b, 21b'; 21c, 21c', 21d, 21d' and a pair of shielding electrodes 23, 23', each of the pairs of measuring electrodes respectively covering a segment of the inner lateral surface of the outer measuring tube 2b. With such a multielectrode arrangement, it is possible to perform in addition to the flow measurement also a recording and measurement of the filling level. This kind of filling level recording and measurement by means of capacitive multielectrode arrangements is known in principle in the prior art. It is not restricted to four pairs of measuring electrodes; it is also possible for three, four, five, six, seven, eight or even more pairs of electrodes to be arranged. In this exemplary embodiment, the signal converter subassembly is likewise embedded in the layers of fibre composite material of the outer part-tube 2b.

The embedding of the magnetic system mounted on the measuring tube 2 in a casting compound 19 takes place in the way described with reference to FIG. 1.

FIG. 4 shows a longitudinal section through an embodiment of an MID according to the invention with a measuring tube 2 made of steel with an insulating lining 401 and a conductive signal tap 21, in the case of which only the magnetic system, comprising the two exciting coils 30, 30a and the ferromagnetic core 32 with the mounting means 33, 33a, 33b, 33c, 33d, 33e, 33f, 33g, is embedded in the casting compound 19. The casting compound 19 is produced by a conventional technique, for example from diecast half-shells. The advantage of this embodiment lies in the low-cost way in which it can be produced with very high geometrical precision of the magnetic system, while retaining tried-and-tested subsystems for the measuring tube, signal tap and housing.

In the embodiment that is shown in FIG. 5, the magnetic system is embedded only partly in the casting compound 19. The ferromagnetic core 32 with the mounting means 33, 33a, 33b, 33c, 33d, 33e, 33f, 33g is embedded, the two exciting coils 30, 30a are conventionally mounted. The exciting coils 30, 30a can also be embedded in the casting compound 19 and the ferromagnetic core 32 could be mounted on it in a conventional way. The embodiment that is shown in FIG. 5 still offers cost advantages and increased geometrical precision in the fastening of the magnetic system in comparison with a conventional manner of constructing an MID, and at the same time requires less extensive modification of the production method than the embodiments represented in FIGS. 1 to 4.

All the customary MIDs that are available today are directed at measuring the through-flow of flowing substances and, what is more, do not have any additional measuring means by which additional information can be derived from the substance being measured or the measuring device itself concerning other measured variables, and be used for example for diagnostic purposes. FIG. 6 shows a longitudinal section of an embodiment of an MID according to the invention which overcomes this disadvantage of the prior art. FIG. 6 shows a longitudinal section through an embodiment of an MID according to the invention which largely coincides with the embodiment shown in cross section in FIG. 2. As a difference from the embodiment according to FIG. 2, in FIG. 6 the magnetic system with the ferromagnetic core 32 and the coils 32, 32a is fastened directly on the measuring tube 2 formed from fibre composite material and embedded in casting compound 19. The broken outline around the measuring electrodes and divided shielding electrodes 20, 22, 22' indicates that they are embedded behind the first winding layers of the measuring tube 2.

In addition, further sensors are also embedded in the measuring tube wall 2 of fibre composite material and in the casting compound 19 in the embodiment that is shown in FIG. 6.

Near the device bounding surface 4 on the side of the substance being measured, a first temperature sensor 56 is embedded in the measuring tube wall of fibre composite material. It may be embedded very near the device bounding surface 4 on the side of the substance being measured or else directly in contact with the substance being measured, so that with it the temperature of the substance being measured can be recorded well on the inner wall of the tube. All common types that are also available today in miniaturized form come into consideration as the temperature sensor, such as for example resistive temperature sensors, thermocouples or semiconductor temperature sensors.

Near the device bounding surface 6 on the ambient side, a second temperature sensor 57 is embedded in the casting compound 19. With this, the wall temperature or the ambient temperature of the measuring device can be recorded. The processing of the sensor signals of the two temperature sensors takes place in the transmitter 8, but may also be already performed in the signal converter subassembly 24.

With knowledge of the geometry and the material properties of the fibre composite material and of the casting compound 19, the difference between the temperature values determined by the two temperature sensors 56, 57 can be used to calculate the thermal flux, and from it the energy exchanged between the substance being measured and the ambience. In this way it would be possible to monitor maintenance of the permissible operating limits of the device. The remaining service life of the measuring tube or of the entire measuring device can also be estimated on the basis of the temperature values recorded. For this purpose, additionally integrated in the transmission 8, or already in the signal converter subassembly 24, is a microprocessor with a memory, in which a corresponding service life model is implemented as software. The measured temperature values are stored there; the historical variation of the temperatures is then supplied to the service life model as an input variable, and the remaining service life to be expected is calculated and passed on by the transmitter for display or further processing in a higher-level process control or plant management system.

Furthermore, a strain sensor 58 is embedded approximately in the centre between the measuring tube and the device bounding surface 6 on the ambient side. This may be, for example, a strain gauge or a strain gauge arrangement in a bridge circuit comprising metal-based or semiconductor-based strain gauges. With the strain sensor 58, the mechanical state of stress in the cast body 19 is determined. A number of strain sensors may also be embedded, distributed at a number of points in the cast body 19. From the information obtained in this way, the multiaxial state of stress of the measuring device can be calculated, and in this way the permissible loading in the respective installation situation can be monitored.

The exemplary embodiments described above do not constitute all possible embodiments of MIDs according to the invention. All further embodiments that are not mentioned here but arise as a result of combinations of the embodiments described here or parts thereof are therefore intended to be covered by the present invention. In particular, in the case of the construction of the magnetic system it is also possible to proceed in such a way—unlike that described in FIG. 2—that the exciting coils are first fixed on the wound body and then the ferromagnetic core is fixed on them.

The invention claimed is:

1. A magnetic-inductive measuring device for flowing substances having a measuring tube and a further subsystem, the measuring device comprising:
   a signal pickup that records measuring signals;
   a magnetic system that generates a magnet field; and
   a housing that bounds the device on an ambient side;
   wherein the housing is a casted housing having a casting compound and at least one subsystem at least partly embedded in the casted housing.

2. Measuring device according to claim 1 wherein the magnetic system is completely embedded in a casting compound.

3. The measuring device according to claim 1 wherein the magnetic system is embedded in the housing formed from a casting compound.

4. The measuring device according to claim 2, wherein the ferromagnetic core is embedded in a casting compound.

5. The measuring device according to claim 2, wherein the exciting coils together with the ferromagnetic core are embedded in a casting compound.

6. The measuring device according to claim 4, wherein the ferromagnetic core is formed from ferromagnetic foil or ferromagnetic metal sheet or ferromagnetic wire or ferromagnetic wire mesh.

7. The measuring device according to claim 6, wherein the ferromagnetic core is formed from iron or iron-nickel or cobalt-iron or silicon-iron or aluminium-iron or ferrite.

8. The measuring device according to claim 3, wherein a shielding layer against electrical or magnetic or electromagnetic fields is embedded in the casting compound at or near the device bounding surface on the ambient side.

9. The measuring device according to claim 8, wherein the shielding layer is formed from conductive plastic or from metal foil or from metal mesh.

10. The measuring device according to claim 1 wherein an electrical connection device is attached at the device boundary on the ambient side and in that electrical connecting conductors are led from the signal pickup and/or the measuring transducer and the coils to the electrical connection device.

11. The measuring device according to claim 10, wherein the electrical connection device comprises a measuring transducer.

12. The measuring device according to claim 1 wherein an electronic signal converter subassembly is embedded in the casting compound.

13. The measuring device according to claim 1 wherein the measuring device comprises at least one further measuring pickup for recording at least one further measured variable of the substance and/or of the hydraulic system.

14. The measuring device according to claim 13, wherein the first and/or second further measuring pickup is a temperature sensor.

15. The measuring device according to claim 13, wherein the first and/or second measuring pickup (58) is a strain gauge.

16. The measuring device according to claim 1 wherein the information obtained from the measuring signal of the further measuring pickup can be used to carry out the device diagnosis, in particular monitoring the operational limit and/or determining the remaining service life.

17. The measuring device according to claim 1 wherein the casting compound is an electrically nonconductive, filled epoxy resin.

18. The measuring device according to claim 1 wherein the casting compound is an electrically nonconductive, filled polyurethane.

19. The measuring device according to claim 1 wherein the casted housing has an inner part and an outer part.

20. The measuring device according to claim 19 wherein the inner part of the casted housing is cast from a different material than the outerpart of the casted housing.

* * * * *